United States Patent [19]
Baker

[11] 3,711,914
[45] Jan. 23, 1973

[54] METHOD FOR ASSEMBLING CENTRIFUGAL BLOWERS

[75] Inventor: Harold L. Baker, Cleveland, Ohio

[73] Assignee: Morrison Products, Inc., Cleveland, Ohio

[22] Filed: Dec. 7, 1970

[21] Appl. No.: 95,987

Related U.S. Application Data

[60] Division of Ser. No. 789,675, Jan. 8, 1069, Pat. No. 3,608,174, which is a continuation-in-part of Ser. No. 649,616, June 28, 1967, Pat. No. 3,423,012.

[52] U.S. Cl. ............... 29/156.8 CF, 29/23.5, 416/178
[51] Int. Cl. ............................................. B23p 15/02
[58] Field of Search........ 29/23.5, 156.8 CF; 416/178

[56] References Cited

UNITED STATES PATENTS

| | | | |
|---|---|---|---|
| 2,195,869 | 4/1940 | Rathbun ...................... 29/156.8 CF |
| 2,231,062 | 2/1941 | Evans ........................ 29/156.8 CF X |
| 3,211,364 | 10/1965 | Wentling et al ............ 29/156.8 CF X |
| 2,431,648 | 11/1947 | Mayne ................................. 416/178 |
| 2,932,446 | 4/1960 | Zaro ..................................... 416/178 |
| 3,138,319 | 6/1964 | Delaney et al ....................... 416/178 |
| 3,164,319 | 1/1965 | Mayne ................................. 416/178 |
| 3,385,511 | 5/1968 | Wentling ............................. 416/178 |

Primary Examiner—Charles W. Lanham
Assistant Examiner—Donald C. Reiley, III
Attorney—Meyer, Tilberry & Body

[57] ABSTRACT

A centrifugal blower wheel is assembled by forming a blade strip into a cylinder around a central hub disc. The circular axial ends of the cylinder are positioned in channel-shaped circular end rings. An axial force is applied to the assembly and the end rings are simultaneously deformed into gripping engagement with the cylinder ends. The central hub disc has a bifurcated outer periphery which is deformed outwardly into engagement with notches in the blades subsequent to deformation of the end rings.

3 Claims, 15 Drawing Figures

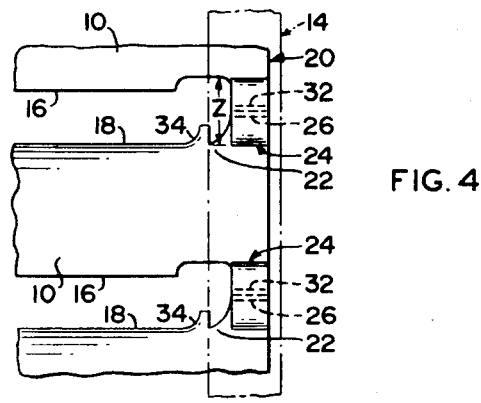
FIG. 4
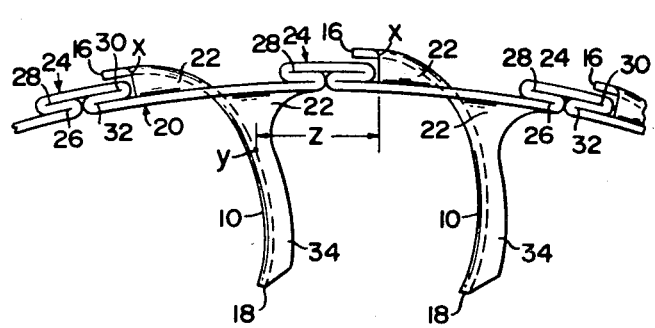
FIG. 5
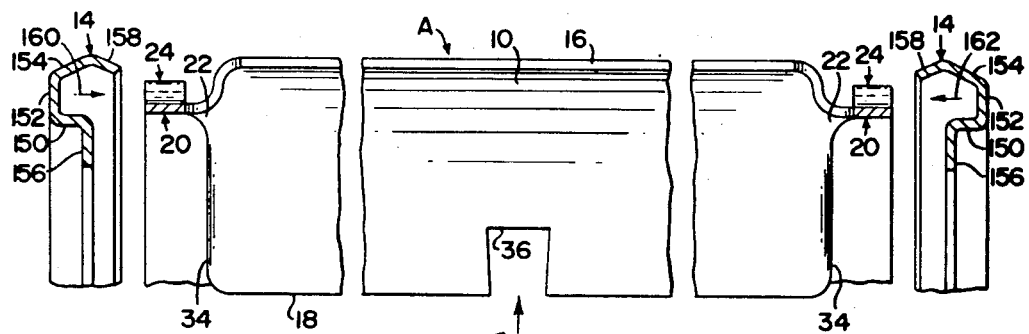
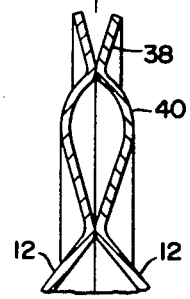
FIG. 6

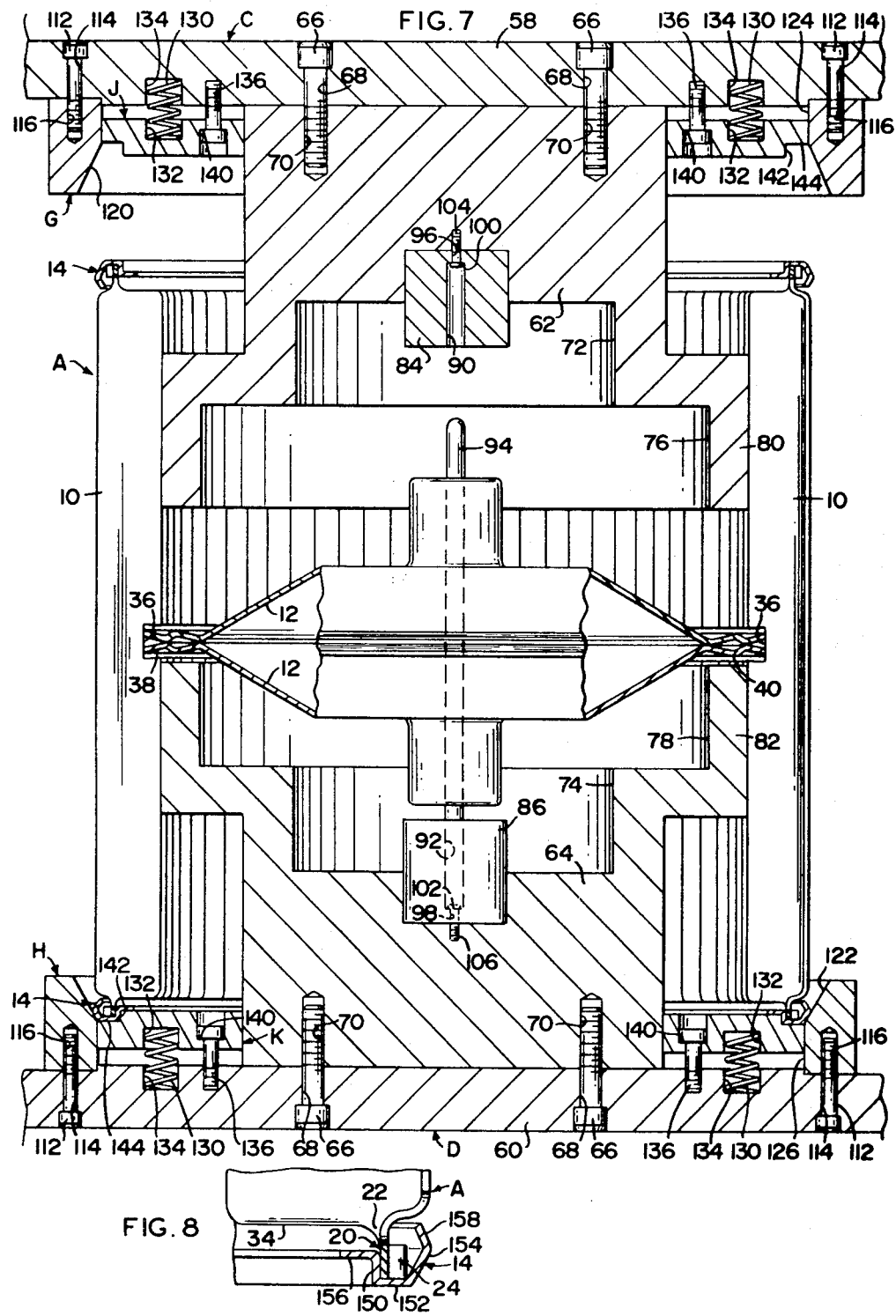

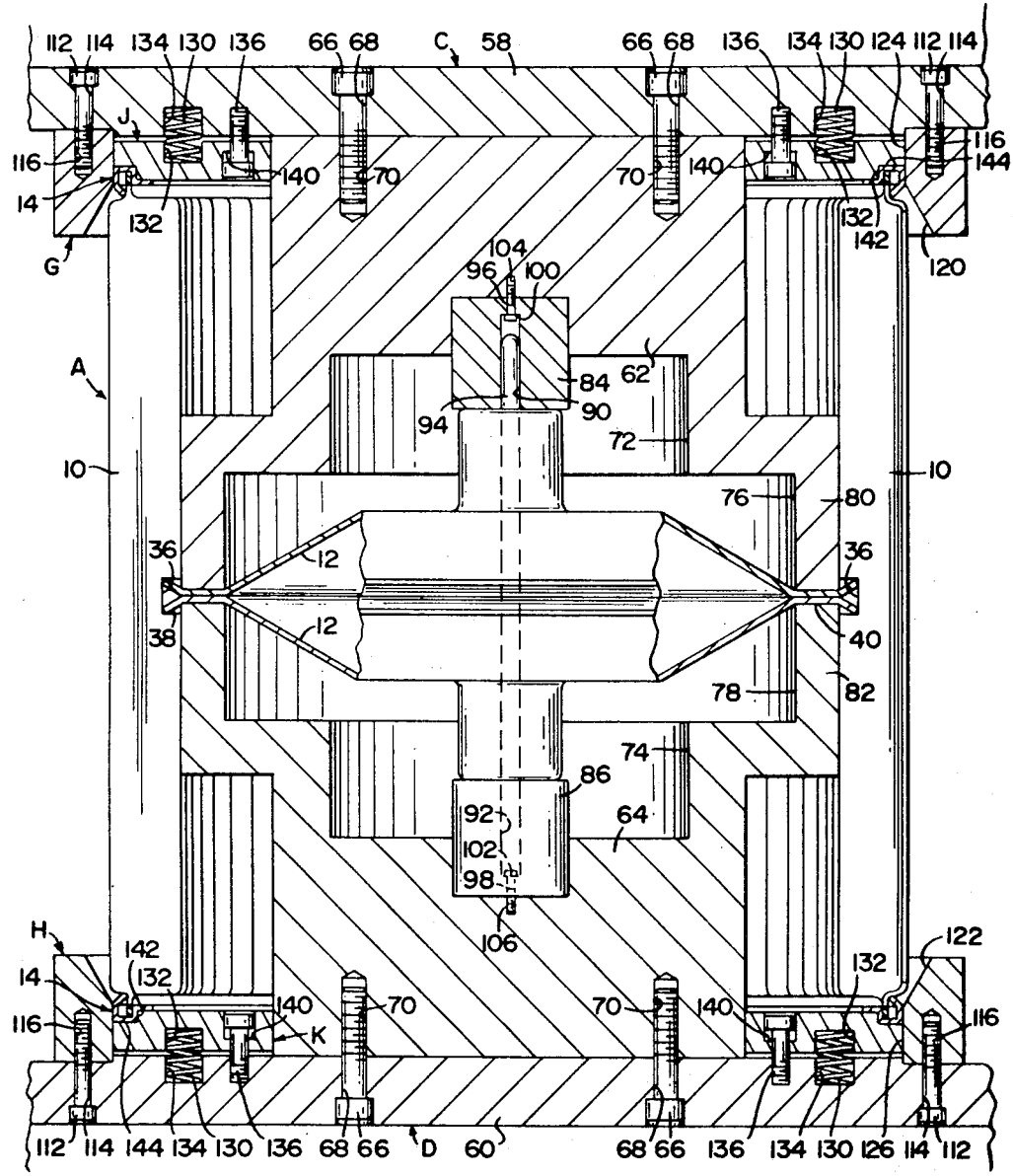

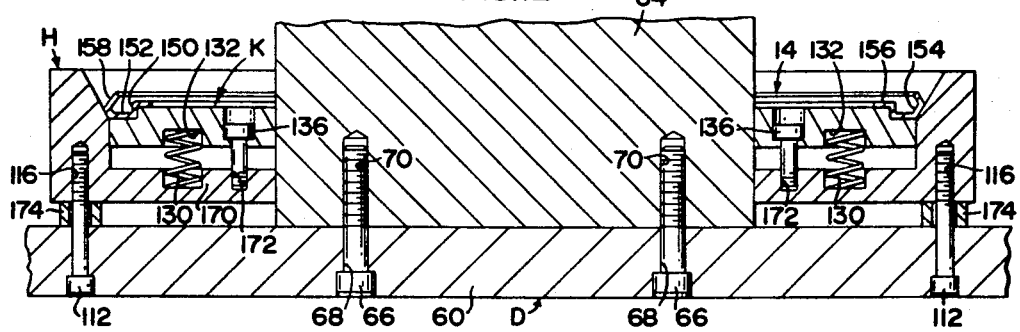
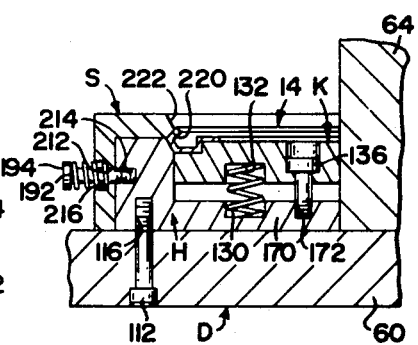

METHOD FOR ASSEMBLING CENTRIFUGAL BLOWERS

This application is a division of co-pending application Ser. No. 789,675 filed Jan. 8, 1969, which in turn is a continuation-in-part of co-pending application Ser. No. 649,616 filed June 28, 1967. Application is now U.S. Pat No. 3,423,012 issued Jan. 21, 1969, and application Ser. No. 789,675 is now U.S. Pat No. 3,608,174 issued Sept. 28, 1971.

This invention relates to the centrifugal blower art and more particularly to an improved method and apparatus for assembling centrifugal blower wheels.

The present invention is particularly applicable to centrifugal blower wheels formed from stamped metal parts, and it will be described with particular reference thereto; however, it will be appreciated that the invention has broader aspects and may be applicable to blower wheels made from other materials formed in different ways, such as molded plastic.

Advances in the construction of blower wheels have resulted in the development of a simplified blade assembly which can be stamped from a continuous sheet of metal. Through appropriate shaping, bending, and assembling steps, there is formed a cylindrical wheel having circumferentially spaced blades. Representative of this established practice are the teachings of U.S. Pat. No. 2,242,586.

In developing this type of blower wheel, emphasis has been placed on using the thinnest possible sheet metal commensurate with the strength requirements needed to maintain the structural integrity of the wheel in operation. This reduces the raw material cost and the weight of the blower wheel. In many applications, a suitable balance between sheet metal thickness and the structural integrity of the blower wheel have been achieved without difficulty. There is, however, a need for lighter weight blower wheels and blower wheels of greater structural integrity for conventional applications. In addition, there is a need for light-weight blower wheels, and blower wheels of high structural integrity and of greater accuracy and trueness (in terms of concentricity and parallelism) for applications requiring extremely large wheels and/or operation at unusually high rotational velocities. The present invention fills these needs by providing an improved apparatus and method of assembly to produce a centrifugal blower wheel of improved construction, having a higher strength to weight ratio and greater trueness and accuracy than heretofore thought possible.

One specific blower wheel which may be advantageously assembled in accordance with the method of the present invention is comprised of a plurality of axially extending, circumferentially spaced blades arranged in the form of a cylinder; a pair of circumferentially extending strips, one adjacent one end of the blades and the other adjacent the other end of the blades; a web integrally connecting an end of each blade with spaced portions of the adjacent strip; each of the blades having a leading edge and a trailing edge and an arcuate axial cross-section with a convex surface facing outwardly and a concave surface facing inwardly of the cylinder; each of the webs extending generally circumferentially of the cylinder from a point about midway between the leading and trailing edges of a blade, forwardly to a point spaced from the leading edge of the blade, leaving a circumferential section of unsupported blade ends between two adjacent spaced blades extending from a point about midway between the leading and trailing edges of one blade, rearwardly, to a point spaced from the leading edge of the adjacent blade; the remaining portions of each of the strips, i.e., those portions disposed between the spaced portions thereof integrally connected to the blade ends by the webs, each having formed therein a generally T-shaped gather with the crosspiece of the T extending longitudinally of the strip and bridging the circumferential section of unsupported blade ends between two adjacent spaced blades. The unsupported portions of the blade ends, i.e., the portions extending from a point about midway between the leading and trailing edges thereof, rearwardly, to the trailing edge thereof, are curved backwardly and inwardly toward the convex surface of the blade, forming a blade-stabilizing lip.

In accordance with the present invention, there is provided an improved method of fabricating a centrifugal blower wheel of the type described, wherein the circumferentially extending strips are embraced with end rings, and the assembly is subjected to axial compressive forces while both the end rings are simultaneously crimped in place.

Centrifugal blower wheels formed in accordance with the assembly method of the present invention have greater structural integrity than blower wheels formed from the same thickness of sheet metal in accordance with the prior art practices. Moreover, centrifugal blower wheels formed in accordance with the teachings of the present invention can be made from sheet metal which is thinner than that used by the prior art, yet the structural integrity of the resulting centrifugal blower wheel will be comparable to that made in accordance with prior art practices from thicker sheet metal. Further, larger blowers, and blowers designed to operate at unusually high rotating velocities, can be satisfactorily manufactured in accordance with the teachings of the present invention.

Centrifugal blower wheels which have inadequate structural integrity tend to be noisy in operation and vibrate excessively. This is believed to be due to the fact that the blades are not sufficiently rigid to withstand the forces of the air rushing by. Consequently, the blades tend to oscillate back and forth about their longitudinal axes i.e., flutter, in an effort to orient themselves to offer less resistance to the air. This in turn sets up eddy currents which introduce noise, vibration and less efficient blower operation. Centrifugal blower wheels produced in accordance with the present invention have blades which are unusually rigid and capable of resisting flutter even under extreme operating conditions.

Therefore, it is a principle object of the present invention to provide an improved method and apparatus for assembling a centrifugal blower wheel.

This and other objects and advantages will become apparent from the following detailed description of a preferred embodiment of the invention when read in connection with the accompanying drawings, in which:

FIG. 4 is a greatly enlarged, fragmentary, schematic plan view showing a blade end construction for the blower wheel of FIG. 1;

FIG. 5 is a greatly enlarged, fragmentary, schematic end view showing a blade end construction for the blower wheel of FIG. 1;

FIG. 6 is a fragmentary, exploded, schematic view of the blower wheel of FIG. 1 prior to assembly;

FIG. 7 is a schematic, section view of a blower wheel mounted in the assembly apparatus of the present invention;

FIG. 8 is a fragmentary sectional view showing a blower wheel end ring prior to deformation in the apparatus of FIG. 7;

FIG. 10 is a schematic section view of the apparatus in a final position during assembly of a blower wheel; and FIG. 11 is a fragmentary sectional view showing a blower wheel end ring after deformation in the apparatus of FIGS. 7, 9 and 10.

FIG. 12 is a side, elevational cross-sectional view of a modified assembly apparatus;

FIG. 13 is a side, elevational cross-sectional view of another modified assembly apparatus;

FIG. 14 is a plan view looking in the direction of arrows 14—14 of FIG. 13; and

FIG. 15 is a partial side, elevational cross-sectional view of still another modified form of assembly apparatus.

Figure 1:
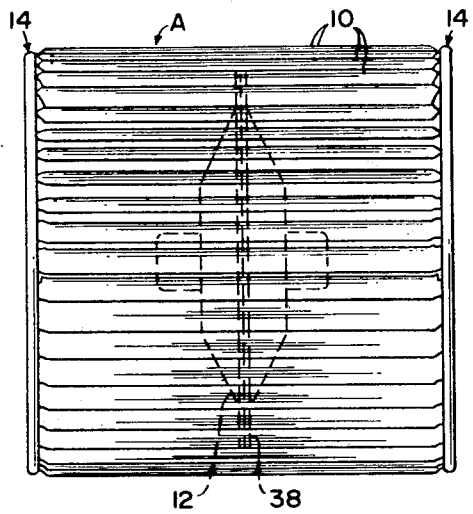
FIG. 1, is a schematic pictorial view of a centrifugal blower wheel assembled with the method and apparatus of the present invention.
Figure 2:
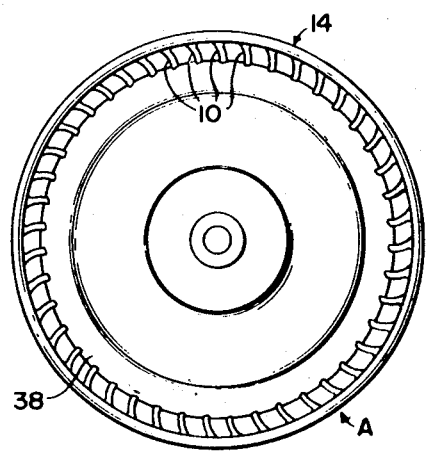
FIG. 2 is a schematic end view of the blower wheel shown in FIG. 1.

Referring now to the drawings wherein the showings are for purposes of illustrating preferred arrangements for practicing the invention only and not for the purpose of limiting the same, FIGS. 1 and 2 show a centrifugal blower wheel A comprising a plurality of integrally connected, axially extending, circumferentially spaced blades 10, arranged in the form of a cylinder, a hub 12, and a pair of annular channel-shaped end rings 14.

Figure 3:
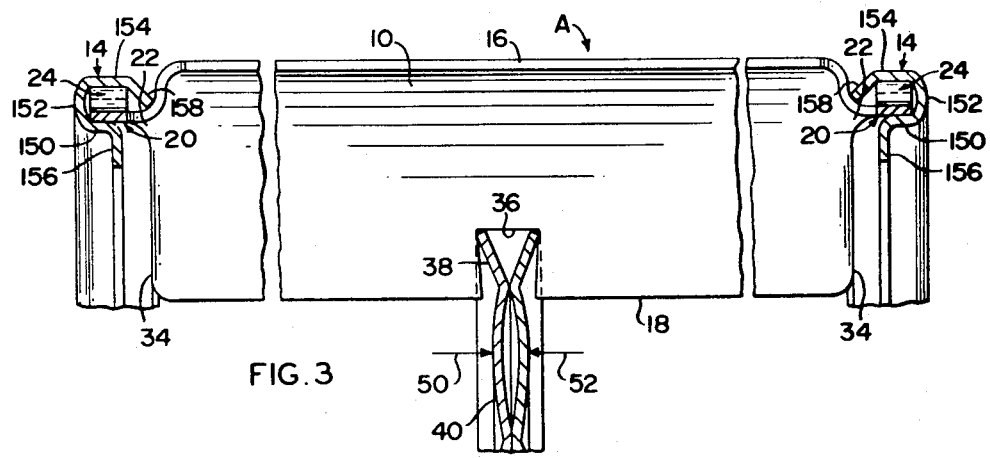
FIG. 3 is a greatly enlarged, fragmentary, schematic view showing the mounting of a single blade of the blower wheel of FIG. 1.

As best seen in FIG. 3 and 5, each of the blades has a leading edge 16, a trailing edge 18, and an arcuate, axial cross-section with a convex surface facing outwardly and a concave surface facing inwardly of cylinder formed by the arrangement of blades.

The centrifugal blower wheel further comprises a pair of circumferentially extending strips 20, and a web 22 integrally connecting an end of each blade with spaced portions of the adjacent strip 20. Webs 22 extend generally circumferentially of the cylinder from a point (marked with the letter y in FIG. 5) about midway between leading and trailing edges 16, 18, of a blade 10 forwardly to a point (marked with the letter x in FIG. 5) spaced from the leading edge 16 of a blade 10. This leaves a circumferential section of unsupported blade ends (marked with the letter z in FIG. 5) between two adjacent spaced blades, extending from a point about midway between leading and trailing edges 16, 18, of one blade, rearwardly to a point spaced from the leading edge 16 of the adjacent blade.

The remaining portions of strip 20 (corresponding to the distance z) i.e., those portions disposed between the spaced portions (the distance from x to y) integrally connected to the ends of blades 10 by webs 22, each have formed therein a generally T-shaped gather designated generally as 24, with the crosspiece of the T extending longitudinally of strip 20 and bridging the circumferential section of unsupported blade ends (corresponding to the distance z) between two adjacent spaced blades 10.

As best seen in FIG. 5, each of T-shaped gathers 24 consists of a single-continuous length of strip 20, formed with first 180° bend defining a first fold 26, a second 180° bend in the opposite direction of the first bend, and defining a second fold 28, a third 180° bend in the same direction as the first bend and defining a third fold 30, and a fourth 180° bend in the same direction as the second bend, and defining a fourth fold 32. The section of strip 20 extending between second and third fold 28, 30, characterizes the crosspiece of the T, and the first and fourth folds 26, 32, abut in the same horizontal plane, characterizing the stem of the T.

This arrangement provides a three layer section of strip 20 as structural reinforcement where it is needed the most, i.e., along those portions of the strip bridging the interconnections of blades 10 with strip 20. When a length of integrally connected blades 10 are shaped to form a cylinder, abutting folds 26, 30 are brought under compression further improving the structural integrity of the resulting blower wheel.

The unsupported portions of the ends of blades 10, i.e., the portions extending from a point about midway between the leading and trailing edges of blade (indicated as y in FIG. 5) rearwardly, to the trailing edge 18 of the blade 10, are curved backwardly and inwardly toward the convex surface of the blade, forming a blade-stabilizing lip 34. Blade-stabilizing lips 34 tend to place the concave surface of the blade under compression and the convex surface of the blade under tension, thereby increasing the structural integrity of the blade and improving its ability to resist distortion and flutter, when rotating at high velocities.

As best seen in FIGS. 3 and 6, trailing edge 18 of blade 10 is provided with a notch 36, and collectively, these notches form a peripheral channel interiorly of the cylinder formed by the arrangement of blades. Notches 36 are adapted to receive a portion of a bifurcated clamping means 38 positioned on the periphery of hub 12. In fabrication of the centrifugal blower wheel; a length of integrally connected blades 10 are wrapped around hub 12, with bifurcated clamping means 38 positioned in the peripheral channel formed by notches 36. Thereafter, annular, channel-shaped end rings 14 are placed over the ends of the cylindrical blower wheel so as to embrace circumferentially extending strips 20 and T-shaped gathers 24. End rings 14 are then crimped so as to frictionally engage T-shaped gathers 24 only, thereby adding two additional thicknesses of metal to the sections of strips 20 requiring a greatest reinforcement i.e., those sections disposed between the spaced portions of strip 20 integrally connected to blade ends 10 by webs 22. Bulbous portion 40 of hub disc 12 is then compressed, as shown by arrows 50 and 52 in FIG. 3, to force bifurcated clamping means 38 outwardly into tight engagement with the edges of notches 36 in blades 10.

FIG. 7 shows an assembly apparatus including a first top die member C and a second bottom die member D. Each die member includes a carrier member 58 and 60. Each die member C and D includes a central deforming member 62 and 64 attached to carrier members 58 and 60 as by bolts 66 extending through holes 68 in carrier members 58 and 60, and into threaded bores 70 in deforming members 62 and 64. Each deforming member 62 and 64 includes central circular recesses 72, 74, 76 and 78. Recesses 76 and 78 define circular flanges 80 and 82. The diameter of circular flanges 80 and 82 on deforming members 62 and 64 is substantially the same as the diameter of a circle on which bulbous portion 40 of hub disc 12 lies. Each deforming member 62 and 64 further includes a support and guide 84 and 86 centrally positioned in recesses 72 and 74. Support guides 84 and 86 include a central bore 90 and 92 for receiving the ends of a rod 94. Holes 96 and 98 of smaller diameter than bores 90 and 92 provide a shoulder 100 and 102 against which the heads of bolts 104 and 106 abut. Bolts 104 and 106 extend into suitable threaded holes in deforming members 62 and 64 for securing guide members 84 and 86 in place.

Each die C and D further includes a circular cam ring C and H attached to carrier members 58 and 60 as by bolts 112 which pass through holes 114 in carrier members 58 and 60, and into threaded bores 116 in cam rings G and H. Each cam ring G and H include an inner sloping cam surface 120 and 122, and a straight surface 124 and 126 which is parallel to the longitudinal axes of die members C and D. Circular straight surfaces 124 and 126 on cam rings G and H have a diameter which is substantially the same as the diameter of a circle defined by the outside surfaces of T-shaped folds 24 on end portion 20 of blower wheel A plus the thickness of material used for end ring 14.

Each die member C and D also has a circular clamping member J and K. Spring members 130, positioned in circular recesses 132 and 134 in clamping members J and K and in carrier members 58 and 60, yieldingly bias clamping members J and K away from carrier members 58 and 60. Clamping members J and K are movable axially of die members C and D relative to bolts 136. Bolts 136 are threaded into suitable bores in carrier members 58 and 60 and have their enlarged heads cooperating with shoulders 140 in clamping members J and K to limit the outward movement of clamping members J and K.

Each clamping member J and K includes an outer peripheral recess defined by an axial wall 142 and a radial wall 144. Circular axial wall 142 preferably has a diameter which is substantially the same as the diameter of a circle defined by the inside surface of an end portion 20 on blower wheel A plus the thickness of the material used for an end ring 14.

In using the apparatus of FIG. 7, top die member C is preferably attached to a vertically reciprocating slide of a press while die member D is attached to the bed of the press. Die member C is vertically movable away from die member D a sufficient distance so that the end portions of flanges 80 and 82 on deforming member 62 and 64 are spaced apart a greater distance then the axial length of a blower wheel A. As shown in FIGS. 6 and 8, end ring 14 is somewhat channel-shaped in cross-section. End ring 14 has a first flange 150 extending axially of blower wheel A and positioned against the inside surface of end portion 20. Ring 14 has a second flange 152 extending radially from first flange 150 and overlying the outer edge of end portion 20 on blower wheel A. Ring 14 has a third flange 154 extending outwardly from second flange 152 at around an eight degree angle which is the same as the slope of cam surfaces 120 and 122 on cam rings G and H. Ring 14 includes a fourth flange 156 extending radially inward from first flange 150. Ring 14 also has a fifth flange 158 extending inwardly from flange 154 at around a 60° angle. The horizontal distance from the inside surface of first flange 150 to the edge of fifth flange 158 is greater than the thickness of end portion 20 of wheel A as measured from the inside surface of end portion 20 to the outside surface of T-shaped folds 24.

In using the apparatus of the present invention, top die C is moved to vertically upward away from bottom die D until the ends of flanges 80 and 82 are separated from one another a distance greater than the longitudinal length of a blower wheel A. A flat blade strip is then taken and formed into a cylinder around hub discs 12 with bifurcated periphery 38 positioned in notches 36 of blades 10. End rings 14 are then placed over end portions 20 by moving end rings 14 in the direction of arrows 160 and 162 in FIG. 6. This assembly is then positioned on die member D as shown in FIG. 7. Guide rod 94 has one end received in bore 92 in guide member 86 and extends through central holes in hub discs 12 to hold the assembly in proper relationship on die D. One end ring 14 rests on clamping member K with second flange 152 resting on wall 144 and first flange 150 resting against wall 142. Fourth flange 156 rests against the flat outer surface of clamping member K and third flange 14 rests against cam surface 122. It will be noted that wall 142 on clamping member K cooperates with first flange 150 to hold ring 14 in an accurate circular condition. If desired, it is possible to slope wall 142 along a portion of its length so that ring 14 is cammed into position. Top die C is then moved vertically down toward bottom die D until the parts occupy the position shown in FIG. 9. In this position, cam rings G and H will have caused third leg 154 of ring 14 to be folded inward to a position substantially parallel with first leg 150. The folded condition of end ring 14 is shown in FIG. 11. End portion 20 of blower wheel A is tightly clamped between first leg 150 and third leg 154. Clamping members J and K tightly clamp against end rings 14 during the folding operation of third leg 154 in order to obtain an accurate fold of leg 154 at its intersection with second leg 152 and provides a very secure locking of end rings 14 on end portions 20 of wheel A. In addition, fifth leg 158 locks forwardly of T-shaped fold 24 in the manner shown in FIG. 11. Fourth leg 156 cooperates with clamping members J and K to firmly hold ring 14 in place while third leg 154 is being deformed and also provides strength against bending of the end rings 14 out of their circular form once they have been deformed. With die parts C and D in the position shown in FIG. 9, end rings 14 are completely deformed into shape. It will be noted that in this position, legs 80 and 82 are still spaced apart far enough that they are not contacting bulbous portion 40 of discs 12. Thus, before bulbous portion 40 is deformed, end rings 14 are securely locked in place on end portions 20 and hold blower wheel A in concentricity without any twisting or other harmful effects caused by bifurcated portion 38 engaging notches 36 when bulbous portion 40 is deformed. While this is the preferred arrangement, it is also possible to dimension legs 80 and 82 so that they contact bulbous portion 40 simultaneously with deformation of end rings 14 by cam rings G and H. Once bulbous portion 40 has been deformed to place bifurcated portion 38 into tight engagement with notches 36, upper die C is again moved upwardly away from bottom die D until legs 80 and 82 are spaced apart a distance greater then the axial length of wheel A so that wheel A may be removed from the dies.

Figure 9:
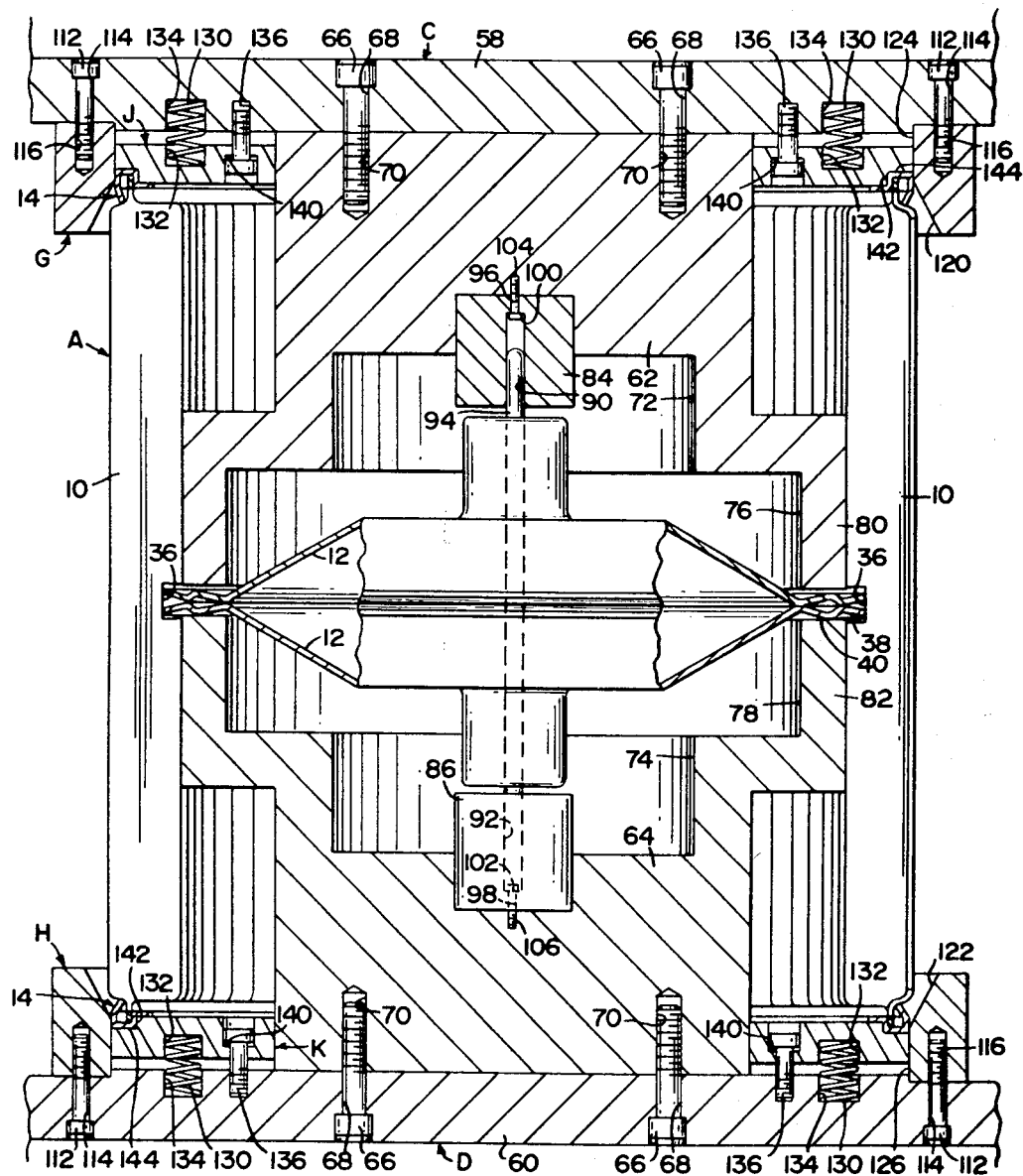
FIG. 9 is a schematic section view of the apparatus of FIG. 7 in an intermediate position during assembly of a blower wheel.

It will also be noted from FIGS. 9 and 10 that clamping members J and K are never bottomed out against carrier members 58 and 60. That is, there is always some resiliency left in clamping members J and K so that wheel A may adjust itself axially when bulbous portion 40 is deformed. For example, bending one leg of deformation 38 out before the other one will cause a greater force to be exerted against one side of notches 36. This greater force against one side of a notch 36 will cause wheel A to adjust itself axially due to yielding clamping members J and K so that bifurcation 38 will be properly engaging both side edges of notches 36 and will be centrally located with respect to wheel A.

It will be understood that it is possible to form a flat blade strip into a cylinder about dies C and D. For example, dies C and D may be separated and hub discs 12 positioned over guide rod 94. A blade strip may then be formed into a cylinder about discs 12 which are positioned on bottom die D. The dies are then operated as previously described.

In addition, it is possible to dimension clamping members J and K, and end rings 14 so that end rings 14 would be frictionally held in position against walls 142 and 144. In this manner, end rings 14 may be positioned on dies C and D prior to blower wheel A and end rings 14 would be positioned on end portions 20 of wheel A as dies C and D move toward one another.

It will be noted that entire blower wheel A is under axial compression from clamping members J and K. This holds wheel A in a concentric cylindrical form while rings 14 and hub discs 12 are deformed. It is also important to note that entire flange 154 of rings 14 is simultaneously deformed into tight gripping engagement with end portions 20. This prevents unequal stress distributions and twisting of wheel A as often occurs when flange 154 is folded over sequentially as by a roller.

The FIG. 12 shows a slightly modified arrangement in which cam rings H include an integral radially inward extending flange 170. In this arrangement, camming member K is carried by flange 170 of cam ring H rather then being attached directly to carrier member D. Bolts 136 extend through holes in clamping member K and thread into suitable bores 172 formed in flange 170 of cam ring H. In this arrangement, it is possible to provide spacer rings 174 between carrier member D and cam ring H. Therefore, the spacing distance between the cam rings and the upper and lower die members may be varied for assemblying blower wheels having various longitudinal lengths. Simply by varying the height of spacers 174 it is possible to vary the spacing of both cam ring H and clamping member K relative to carrier member D so that blower wheels of other longitudinal lengths can readily be assembled.

In another arrangement of the present invention, the cam rings may be made up of a plurality of arcuate segments. As shown in FIGS. 13 and 14, a generally circular cam ring is made up of a plurality of arcuate segments P. It should be understood that clamping member K may also be made up from a plurality of arcuate segments if so desired. In the arrangement shown, a circular support ring 180 is secured to carrier member D by suitable bolts 112 extending through holes in carrier member D and into threaded bores 182 in support member 180. Clamping member K is then secured to support member 180 by suitable bolts 136 passing through holes in clamping member K and into threaded bores 184 in support member 180. Also, spring means 130 positioned in recesses 132 and 186 of clamping member K and support member 180 respectively. Arcuate segments P are provided with lateral holes 188 to which preferably extend radially from the vertical axis of deforming member 64. Enlarged diameter recesses 190 provide a shoulder against which springs 192 abut. The other ends of springs 192 abut the heads of bolts 194 which extend through lateral holes 188 and thread into threaded bores 196 in support member 180. In this arrangement, springs 192 bias segments P radially inward against the periphery of support member 180. Arcuate segments P have an inner sloping surface 202 which slopes at substantially the same angle as flange 154 of end ring 14. Segments P also have oppositely sloped surfaces 204 which slope at substantially the same angle as flange 158 of end ring 14. Arcuate segments P also have an outer sloping cam surface 206. With this arrangement, an end ring 14 may be positioned with flange 152 or flange 154 resting against sloping surface 206 of segments P. Downward force on end ring 14 will then cause arcuate segments P to move radially outward against the biasing force of springs 192. Segments P will move outwardly until end ring 14 snaps down into the position shown in FIG. 13. Arcuate segments P will then move radially inward under the influence of springs 192 for holding end ring 14 securely in position with the cooperation of sloping surface 204 and flange 158.

In a modification of the arrangement of FIG. 13 for use with the arrangement of FIG. 12, a plurality of arcuate holding segments S are held to cam ring H by lateral bolts 194 passing through lateral holes 212 in arcuate segments S and threading into threaded bores 214 in cam ring H. Springs 192 bias against the head of bolts 194 and against a shoulder 216 of an enlarged recess in segments S. The inner peripheral edge of segments S is provided with oppositely sloping surfaces 220 and 222 for holding a cam ring 14 in position in the same manner as described with respect to FIG. 13. With such an arrangement, an end ring 14 may be positioned on a die member prior to insertion of a cylindrical blade strip into the die.

While the invention has been described with reference only to a preferred embodiment, it is obvious that modifications and alterations will occur to others upon the reading and understanding of this specification.

I claim:

1. A method of assembling a blower wheel from an elongated blade strip and a pair of end rings comprising the steps of:
   a. forming said blade strip into a cylinder having a longitudinal axis and circular end portions,
   b. placing said end rings over said end portions of said cylinder, said end rings including a first flange extending axially of said cylinder inside of said end portions, a second flange extending radially of said cylinder over the outer edges of said end portions, and a third flange extending outwardly from said second flange,
   c. applying compressive force to said second flanges axially of said cylinder for holding said second flanges against said outer edges of said end portions, and
   d. moving camming rings axially of said cylinder into engagement with said third flanges for applying bending force to said third flanges to bend said third flanges to a position substantially perpendicular to said second flanges and overlying the outside periphery of said end portions so that said end portions are squeezed radially of said longitudinal axis between said first and third flanges.

2. The method of claim 1 wherein said blade strip has blades with inner edges and notches having opposite edges are formed in said inner edges, said strip being formed into a cylinder about hub disc means having a circular outer periphery received in said notches, said outer periphery being bifurcated to provide bifurcated portions diverging from said hub disc means toward said opposite edges of said notches, and further including the step of expanding said bifurcated portions outwardly into firm engagement with said edges of said notches not earlier than said step of bending said third flanges of said end rings while maintaining said compressive force on said second flanges.

3. The method of claim 2 wherein said step of expanding said bifurcated portions of said hub disc means into engagement with said edges of said notches is performed subsequent to the step of bending said third flanges of said end rings.

* * * * *